Patented June 22, 1943

2,322,206

UNITED STATES PATENT OFFICE 2,322,206

GAS ABSORBENT AND METHOD FOR PREPARING THE SAME

Clyde B. Gardenier, Belleville, N. J., assignor to Thomas A. Edison, Incorporated, West Orange, N. J., a corporation of New Jersey No Drawing. Application December 16, 1942, Serial No. 469,231

11 Claims. (Cl. 252—189)

This invention relates to absorbents and to new methods for producing the same, and is more particularly directed to an absorbent for acidic compounds. In one of its more specific aspects the invention is concerned with a composition which may be employed in respirators.

Among others, the novel product of the present invention may be used in such devices as warfare gas masks, high altitude respirators and masks and other respirators generally employed in hospitals and the like for the administration of an anesthetic or other gas to a patient. The invention has been found particularly efficacious for the absorption of acidic gases, such as carbon dioxide gas, from systems of respiration, as in apparatus currently employed in submarines, oxygen tents and for administering anesthesia.

For a long time prior to this invention, alkaline compositions have been employed for the absorption of acidic gases. The more widely known and used composition for this purpose has been soda lime, which is composed of sodium hydroxide and calcium hydroxide. While soda lime is a fairly efficient absorber for acidic gases, it has a number of serious defects which have caused considerable difficulties in its use. Some of these defects are as follows:

(1) Water must be added to the soda lime because it is an effective absorbent only when it is in a proper state of humidity. The addition of too little water to the soda lime impairs its efficiency while the addition of too much water to the soda lime may provide a sloppy mass.

(2) Soda lime tends to yield up and absorb water according to the relative humidity of the ambient and this coupled with the fact that moisture content of the absorbent cannot be detected by its color or in some other simple manner, has necessitated its being carefully preserved while in storage.

(3) Soda lime has a weak friable structure and consequently dusts readily and it has been found practically impossible to prevent some of the dust particles from being carried throughout the system in which it is used. In an effort to avoid dusting it has been proposed to add an inert cementitious material to the soda lime. While dusting may be reduced by such additions, the efficiency of the absorbent has been found to become considerably reduced thereby.

(4) The reaction of soda lime with acidic gases and upon taking up water causes the generation of a relatively large amount of heat. This causes a rise in temperature of the inhalant.

(5) Soda lime is of such a caustic nature as to have caused burns on the patient as well as on the operators and assistants when used in respirators in operating rooms. The heat generation, dusting and causticity of the soda lime when used in anesthetic apparatus have been known not only to have caused coughing by the patient, but have caused serious irritation and in some cases very serious injury.

Although soda lime has been generally used in this country, a number of other compositions for the absorption of acidic gases have been proposed.

British Patent 277,540 of September 22, 1927 proposes a gas absorbent consisting of hydrated barium hydroxide, caustic soda, water, slaked lime and activated powdered charcoal. The ratio of the quantity of the hydrated barium hydroxide by weight to the quantity of slaked lime by weight is 3 to 2 and the ratio of the quantity of caustic soda by weight to the quantity of slaked lime by weight is 1 to 12.

British Patent 473,913 of October 22, 1937 proposes a gas absorbent made by mixing to a damp powder slaked lime and an aqueous solution of sodium acetate, which damp powder is agglomerated into tablets. These tablets are dried and then calcined above the temperature of fusion of sodium acetate to drive off the water of crystallization of the sodium acetate until it becomes anhydrous. The anhydrous sodium acetate is heated to melting and according to the patentee on cooling crystallizes and unites with the lime to give a hard cement. To this product is added an aqueous solution of a caustic alkali to provide a gas absorbent.

The useful products produced by following the teachings of said British patents are no better than soda lime because they employ caustic alkali as a constituent thereof.

The present invention has been made to provide novel acidic gas absorbents which are substantially free of caustic alkali, which are highly efficient and which eliminate or materially reduce most of the disadvantageous characteristics inherent in the absorbents of the prior art. Some of the characteristics of an acidic gas absorbent embodying the present invention as well as a comparison of its characteristics with those of soda lime may be found in the article by Melville G. Kilborn, M. D. entitled "Preliminary Clinical Report on a New Carbon Dioxide Absorbent-Baralyme," published on pp. 621–627 of Anesthesiology, vol. 2, No. 6, November 1941 and in the article by John Adriani, M. D. and Douglas H.

Batten, M. D. entitled "The Efficiency of Mixtures of Barium and Calcium Hydroxides in the Absorption of Carbon Dioxide in Rebreathing Appliances," published on pp. 1–10 of Anesthesiology, vol. 3, No. 1, January 1942.

The novel acidic gas absorbents embodying the invention as well as the methods for preparing the same will be briefly described herein.

In accordance with the present invention, lime is one of the principal constituents of my novel acidic gas absorbents and as used herein the term "lime" includes lime in both slaked and unslaked condition, i. e., calcium hydroxide, $Ca(OH)_2$ and calcium oxide, $CaO$. Lime is well known for its ability to absorb acidic gases provided it is in intimate contact with moisture as then it readily combines with acidic gases to form salts. In its common, hydroxide form, lime has the characteristic of being non-caustic. The physical properties of lime are such as to render it undesirable when used alone as a gas absorbent because in its natural state it is a dry amorphous substance of fine, dusty character.

According to the present invention, there is employed lime, and preferably the hydroxide form thereof, together with a material amount of barium hydroxide, with the barium hydroxide being present in such amount as to provide a product which is substantially non-hygroscopic and non-caustic, which is resistant to erosion and crumbling and is so porous as to be permeable to the acidic gases which it is capable of absorbing. The ratio of the quantity by weight of said calcium hydroxide to the quantity by weight of said barium hydroxide is between about 1 to 1 and 12 to 1 and preferably between about 4 to 1 and 10 to 1. At least a portion of said barium hydroxide contains water of crystallization and the ratio of the total amount by moles of water of crystallization of said barium hydroxide to the total amount by moles of said barium hydroxide in said product may be as low as about 1 to 1 and as high as the mole ratio of said water of crystallization to said barium hydroxide when said barium hydroxide is in its fully hydrated condition. Barium hydroxide in its fully hydrated condition has eight moles of water of crystallization and has the following formula $Ba(OH)_2.8H_2O$.

Instead of employing said barium hydroxide in its fully hydrated condition as exemplified in the above formulae, said barium hydroxide in its partially hydrated condition may be used and in some cases is preferable.

In the practice of this invention, I prefer to employ barium hydroxide with the lime, with at least a portion of said barium hydroxide being hydrated. The quantity by weight of calcium hydroxide to that of the barium hydroxide is between about 1 to 1 and 12 to 1 and this ratio is preferably greater than 1 to 1 and between about 4 to 1 and 10 to 1. At least a portion of the barium hydroxide contains water of crystallization and the ratio of the total number of moles of water of crystallization of the barium hydroxide in the final product to the total number of moles of barium hydroxide in the final product is between about 1 to 1 and 8 to 1 and preferably greater than 1 to 1 and between 2 to 1 and 6 to 1. The ratio of the calcium hydroxide to the hydrated barium hydroxide, both by weight, is greater than 1 to 1.

In carrying out a specific form of the present invention, I mix between about 1 to 5 parts by weight of comminuted dry calcium hydroxide, $Ca(OH)_2$, with about 1 part by weight of comminuted dry full hydrated barium hydroxide which contains 8 moles of water of crystallization per mole of barium hydroxide $Ba(OH)_2$ and generally designated as follows: $Ba(OH)_2.8H_2O$. Thus said mixture contains between 1 to 5 parts by weight of calcium hydroxide $Ca(OH)_2$, .59 part by weight of barium hydroxide $Ba(OH)_2$ and .41 part by weight of water of crystallization.

After an intimate and uniform mixture of said dry calcium hydroxide and dry fully hydrated barium hydroxide is obtained, it is subjected to a high pressure in such a manner and to such degree—typically to several tons per square inch—as will elevate the temperature of the mix to within that range of temperatures between which the fully hydrated barium hydroxide will become melted or fused and yet below the temperature at which the water of crystallization is liberated therefrom. Specifically, the temperature of said mass due to compression is preferably above about 78° C. and below about 95° C. This compressed composition is then cooled and represents the final product. In subjecting this mixture to such high pressure that the temperature thereof is elevated to within the above range, the fully hydrated barium hydroxide, whose melting point is about 78° C. will become melted and there is formed a permanent bond between the constituents of the mixture wherein the water of crystallization of the barium hydrate is brought into intimate relation with the calcium hydroxide to provide the necessary intimate presence of moisture for enabling the calcium hydroxide to react readily with the acidic gases. The bond effected between the constituents of the mixture is not due so much to mechanical cohesion as it is to a particular re-crystallization resulting from the forming process above described and causing an interlocking in molecular structure of the different constituents. For instance, the fusion of the fully hydrated barium hydroxide by the heat of compression apparently causes a wetting of the compressed mixture and a slight dissolving of the calcium hydroxide. When this compressed mixture cools, there are formed crystals of the hydroxides of barium and calcium; these crystals become homogeneously dispersed throughout the mixture and form a skeleton aggregate in which is locked the undissolved calcium hydroxide in a finely divided and substantially unchanged form. Moreover, the water of crystallization becomes locked in this structure and is retained throughout a range of ambient temperature up to about 95° C., which is the temperature at which the water of crystallization is liberated.

The pellets formed according to the above described process are dry, hard in structure and resistant to erosion, crumbling and dusting; yet they have a high degree of porosity and permeability to gases and being made wholly of active material, they have a high absorption characteristic. They are non-caustic and have a low heat of reaction with acidic gases and are free of caustic alkali. They are remarkably stable as they are non-hygroscopic and have an inherent moisture content for facilitating their reaction with acidic gases, which is not altered by exposure to the ordinary ambient as heretofore explained.

In carrying out another form of my invention with the use of calcium oxide and barium hydrate, I mix between about 1 to 5 parts by weight of dry, calcium oxide with 1 part by weight of dry barium hydrate which is fully hydrated barium hydroxide and then form the mixture into pellets in the manner above described. In the compressing of this mixture, some of the water of crystallization of the hydrate barium hydroxide chemically combines with the calcium oxide to form calcium hydroxide—which is evidenced by a sudden rise in temperature of the mixture during the compressing operation. This use of some of the water of crystallization in forming said calcium hydroxide is found to weaken the bond between the constituents of the pellets; however, after the pellets are formed a firm bond may be produced, as in the manner explained above in connection with the product formed from calcium hydroxide, by physically adding water to the pellets through humidification. In the humidifying process, no more moisture should be added to the pellets than that which is sufficient to compensate for the moisture taken up by the calcium oxide, as the addition of more than this amount of moisture will only serve to clog the pores of the absorbent and reduce its permeability. The amount of water taken up in compensating for that used by the calcium oxide becomes integrally united and locked in the structure of the absorbent, and is not lost by drying or by exposure of the absorbent to varying ambient temperature up to about 95° C., as aforementioned. In using calcium oxide as an initial constituent and in carrying out the process in the manner here described, I obtain a final product which has about the same quantitative and qualitative efficiency as that formed from calcium hydroxide, but which has an even harder structure, the greater degree of hardness coming apparently from a greater interlocking in molecular structure induced by the chemical reaction of the hydrate with the calcium oxide.

Still another specific and preferred form of my invention is the combination of calcium hydroxide and barium hydroxide, with at least a portion of the barium hydroxide containing less than eight molecules of water of hydration per molecule of barium hydroxide and the quantity of the calcium hydroxide by weight to the quantity of the barium hydroxide by weight being greater than 2 to 1 and between about 4 to 1 and 10 to 1.

A preferred method of producing this product is as follows:

About 13 gallons of hot water are measured into a 50 gallon capacity dough mixer, such as the "Day mixer"; then 12 pounds of barium hydrate crystals, $Ba(OH)_2 \cdot 8H_2O$ are slowly added to this hot water which is continuously agitated throughout the addition of said barium hydrate and until a complete solution is obtained. This operation is fast but I prefer to maintain said agitation for a period of between about 10 to 30 minutes. Then about 100 pounds of pure calcium hydroxide is poured into said mixer and the mass is agitated for about 15 to 30 minutes, the sides are then scraped down and the agitation is continued for another 15 to 30 minutes at the end of which period, the mass is a substantially uniform and homogeneous mixture of the fully hydrated barium hydroxide $Ba(OH)_2 \cdot 8H_2O$ and the calcium hydroxide $Ca(OH)_2$. This mixture is now a thick, semi-fluid paste-like mass of the consistency about that of soft putty and is capable of flowing from the mixer while hot.

The mixer is inverted and said thick mixture is poured into flat Monel metal shallow pans measuring about 24 inches long, 18 inches wide and 3 inches deep. The pans are filled with said homogeneous mixture and are placed in an oven maintained at a temperature of about 130° C. The mixture in said pans remains in said oven at said temperature to dry the same and to remove therefrom at least a portion of the water of crystallization from said fully hydrated barium hydroxide.

This mixture is maintained at said temperature for about 48 hours after which period the material is a shrunken cracked cake characterised by a top coating of "Flowers" of dried partially hydrated barium hydroxide containing but one mole of water of crystallization per mole of barium hydroxide. This visual phenomenon is utilized as test evidence of the satisfactory condition of the "dry cake." Practically all of the water of crystallization may be removed from the hydrated barium hydroxide by subjecting said mixture to a still higher temperature and for a comparatively longer time. However, I have found that the purposes of this invention are satisfied by removing about 87.5% of the water of crystallization from said fully hydrated barium hydroxide to provide an intimate and homogeneous mixture of calcium hydroxide $Ca(OH)_2$ and a hydrated barium hydroxide containing only one water of crystallization, $Ba(OH)_2 \cdot H_2O$. This dry cake which may be completely dehydrated or may contain one mole of water of crystallization for each mole of barium hydroxide is broken up into a substantially powdered form and the same is mixed with a quantity of barium hydrate, $Ba(OH)_2 \cdot 8H_2O$, sufficient to provide a ratio by weight of the quantity of the barium hydroxide to the quantity of the calcium hydroxide between about 4 to 1 and 10 to 1 and to provide a ratio of the total number of moles of water of crystallization of said barium hydroxide to the total number of moles of said barium hydroxide of between about 2 to 1 and 6 to 1.

After pulverization of said dry cake consisting of $Ca(OH)_2$ and $Ba(OH)_2 \cdot H_2O$ there is added about 12 pounds of barium hydrate,

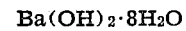

$$Ba(OH)_2 \cdot 8H_2O$$

and a substantially uniform mixture of the same is produced. Then the mixture is passed through a sifter-mixer equipped with about a 12 mesh screen and the dry mixing is continued for about an hour after the material has passed through the mixer to assure complete and uniform distribution of the components with respect to each other. This mixture may be pelleted by subjecting said mixture to such pressure that the temperature thereof is elevated to between 78° C. and 95° C. This final product will be found to be dry, non-hygroscopic, resistant to erosion and crumbling and porous and will have good absorption characteristics.

The speed of pelleting may be increased without adversely affecting the final product by taking the sifted mixture and "slugging" it in a slow speed pelleting machine equipped to produce flat wafers about ½ inch in diameter and ⅛ inch thick and of a hardness similar to "Necco" candy wafers. These wafers are transferred to an oscillating sifter and mixer or granulator equipped with a 16 mesh screen. The wafers are reduced to a powder of such a homogeneous mixture and such physical characteristics that pellets thereof may be made at a high rate of speed on a pelleting machine to provide a dry, acidic gas absorbent product, resistant to erosion and crumbling, substantially non-hygroscopic and permeable to said gas. The compression in this last operation is carried out at such a pressure that the temperature of the mixture is elevated to between 78° C. and 95° C. The pellets are then allowed to cool and are ready for use. The final product obtained by this specific preferred form of the invention is free of caustic alkali and contains calcium hydroxide, Ca(OH)$_2$ and barium hydroxide, Ba(OH)$_2$, in the ratio by weight of about 7 to 1 and the ratio of the total number of moles of water of crystallization of said barium hydroxide to the total number of moles of barium hydroxide in said product is about 4.5 to 1 and the ratio of the calcium hydroxide to the hydrated barium hydroxide is about 5 to 1.

This application is a continuation in part of my co-pending application Serial No. 385,469, filed March 27, 1941.

I claim:

1. A substantially dry solid product for absorbing acidic gases comprising calcium hydroxide and a material amount of barium hydroxide containing water of crystallization, said barium hydroxide being present in such amount as to give a product resistant to erosion and crumbling, said product being substantially free of caustic alkali and being substantially non-hygroscopic, said product being permeable to said gases.

2. A substantially dry solid product for absorbing acidic gases comprising calcium hydroxide and a material amount of hydrated barium hydroxide, said hydrated barium hydroxide being present in such amount as to give a product resistant to erosion and crumbling, the ratio of the former to the latter by weight being greater than one, said product being substantially free of caustic alkali, said product being permeable to said gases.

3. A substantially dry solid product for absorbing acidic gases comprising calcium hydroxide and a material amount of barium hydroxide, the ratio of the quantity by weight of said calcium hydroxide to the quantity by weight of said barium hydroxide being greater than about 2 to 1, a portion of said barium hydroxide containing water of crystallization, the ratio of the total amount by moles of the water of crystallization of the barium hydroxide in said product to the total amount by moles of the barium hydroxide in said product being greater than 1 to 1, said product being free of caustic alkali and permeable to said gases, said product being resistant to erosion and crumbling, said product being substantially non-hygroscopic.

4. A substantially dry solid product for absorbing acidic gases comprising calcium hydroxide and a material amount of barium hydroxide, said barium hydroxide being present in such amount as to give a product resistant to erosion and crumbling, a portion of said barium hydroxide containing water of crystallization, the ratio of the total amount by moles of the water of crystallization of the barium hydroxide in said product to the total amount by moles of barium hydroxide in said product being greater than about 1 to 1, said product being substantially free of caustic alkali and being permeable to said gases, said product being substantially non-hygroscopic.

5. A substantially dry solid product for absorbing acidic gases comprising calcium hydroxide and a material amount of hydrated barium hydroxide, said hydrated barium hydroxide being present in such amount as to give a product resistant to erosion and crumbling, a portion of said hydrated barium hydroxide being incompletely hydrated, the quantity of said calcium hydroxide by weight being greater than the quantity of said hydrated barium hydroxide by weight, said product being substantially free of caustic alkali, said product being permeable to said gases and being substantially non-hygroscopic.

6. A substantially dry solid product for absorbing acidic gases comprising calcium hydroxide and a material amount of hydrated barium hydroxide, said hydrated barium hydroxide being present in such amount as to give a product resistant to erosion and crumbling, a portion of said hydrated barium hydroxide containing less than 8 moles of water per mole of barium hydroxide, and another portion thereof containing 8 moles of water per mole of barium hydroxide, the quantity of said calcium hydroxide by weight being greater than the quantity of said hydrated barium hydroxide by weight, said product being substantially free of caustic alkali, said product being permeable to said gases and being substantially non-hydroscopic.

7. A substantially dry solid product for absorbing acidic gases comprising calcium hydroxide and a material amount of barium hydroxide, the ratio of the quantity by weight of said calcium hydroxide to the quantity by weight of said barium hydroxide being greater than about 2 to 1 and less than about 12 to 1, a portion of said barium hydroxide containing water of crystallization, the ratio of the total amount by moles of the water of crystallization of the barium hydroxide in said product to the total amount by moles of the barium hydroxide in said product being greater than 1 to 1, said product being substantially free of caustic alkali and permeable to said gases, said product being resistant to erosion and crumbling, said product being substantially non-hygroscopic.

8. A substantially dry solid product for absorbing acidic gases comprising calcium hydroxide and barium hydroxide, the ratio of the quantity by weight of said calcium hydroxide to the quantity by weight of said barium hydroxide being between about 4 to 1 and 10 to 1, said barium hydroxide containing water of crystallization, the ratio of the total amount by moles of the water of crystallization of said barium hydroxide in said product to the total amount by moles of the barium hydroxide in said product being between about 2 to 1 and 6 to 1, said product being substantially free of caustic alkali and permeable to said gases, said product being resistant to erosion and crumbling, said product being substantially non-hygroscopic.

9. A substantially dry solid product for absorbing acidic gases comprising calcium hydroxide and barium hydroxide, the ratio of the quantity by weight of said calcium hydroxide to the quantity by weight of said barium hydroxide being about 7 to 1, said barium hydroxide containing water of crystallization, the ratio of the total amount by moles of the water of crystallization of said barium hydroxide in said product to the total amount by moles of the barium hydroxide in said product being about 4.5 to 1, said product being substantially free of caustic alkali and permeable to said gases, said product being resistant to erosion and crumbling, said product being substantially non-hygroscopic.

10. The method of forming a porous product for absorbing acidic gases, comprising subjecting a substantially dry mix comprising calcium hydroxide and hydrated barium hydroxide to such a pressure that the temperature thereof is elevated to between about 78° C. and 95° C. and then cooling said mix.

11. The method of forming an acidic gas permeable product capable of absorbing acidic gases comprising heating a mixture of calcium hydroxide and hydrated barium hydroxide to remove a portion of the water of crystallization from said hydrated barium hydroxide, comminuting said mixture, mixing therewith a quantity of hydrated barium hydroxide, having a greater mole ratio of water to barium hydroxide than that of the hydrated barium hydroxide in said mixture after said heating step, and subjecting said last mentioned mixture to such a pressure that the temperature thereof is elevated to between 78° C. and 95° C., then cooling said mixture.

CLYDE B. GARDENIER.